(12) United States Patent
Oviedo et al.

(10) Patent No.: US 12,464,561 B2
(45) Date of Patent: Nov. 4, 2025

(54) ENABLING MULTIPLE STARTING SYMBOL OCCASIONS FOR CONFIGURED GRANTS IN NEW RADIO (NR) SYSTEMS OPERATING ON UNLICENSED SPECTRUM

(71) Applicant: Apple Inc., Cupertino, CA (US)

(72) Inventors: Jose Armando Oviedo, Aalborg (DK); Salvatore Talarico, Sunnyvale, CA (US); Yingyang Li, Santa Clara, CA (US); Yongjun Kwak, Portland, OR (US)

(73) Assignee: Apple Inc., Cupertino, CA (US)

( * ) Notice: Subject to any disclaimer, the term of this patent is extended or adjusted under 35 U.S.C. 154(b) by 642 days.

(21) Appl. No.: 17/442,393

(22) PCT Filed: Mar. 30, 2020

(86) PCT No.: PCT/US2020/025712
§ 371 (c)(1),
(2) Date: Sep. 23, 2021

(87) PCT Pub. No.: WO2020/198735
PCT Pub. Date: Oct. 1, 2020

(65) Prior Publication Data
US 2022/0174736 A1    Jun. 2, 2022

Related U.S. Application Data

(60) Provisional application No. 62/825,649, filed on Mar. 28, 2019.

(51) Int. Cl.
*H04W 74/0808* (2024.01)
*H04L 1/1867* (2023.01)
(Continued)

(52) U.S. Cl.
CPC ....... *H04W 74/0808* (2013.01); *H04L 1/1893* (2013.01); *H04L 5/0044* (2013.01);
(Continued)

(58) Field of Classification Search
CPC ......... H04W 74/0808; H04W 72/0446; H04W 72/23; H04W 52/0238; H04L 1/1893;
(Continued)

(56) References Cited

U.S. PATENT DOCUMENTS

2019/0165896 A1* 5/2019 Huang ................. H04L 1/1664
2020/0137779 A1* 4/2020 Sun ....................... H04W 16/14
(Continued)

FOREIGN PATENT DOCUMENTS

WO     2017/196994 A1    11/2017

OTHER PUBLICATIONS

International Report on Patentability dated Sep. 28, 2021 in connection with PCT Application No. PCT/US2020/025712.
(Continued)

*Primary Examiner* — Ivan O Latorre
(74) *Attorney, Agent, or Firm* — Eschweiler & Potashnik, LLC; Matthew W Glause

(57) ABSTRACT

A network device (e.g., a user equipment (UE), a new radio NB (gNB), or other network component) can process or generate a Physical Uplink Shared Channel (PUSCH) based on a configured grant that enables different configurations with multiple starting symbol occasions for the configured grants in new radio (NR) unlicensed communications. The PUSCH can be type A or as type B based on the configured grant. A number M of demodulation reference signals (DMRSs) and a number N of starting symbol occasions in a slot can be configured according to the configured grant, wherein M and N comprise an integer greater than zero, respectively.

20 Claims, 8 Drawing Sheets

(51) Int. Cl.
  *H04L 5/00*       (2006.01)
  *H04W 72/0446*    (2023.01)
  *H04W 72/23*      (2023.01)

(52) U.S. Cl.
  CPC .......... *H04L 5/0048* (2013.01); *H04L 5/0053* (2013.01); *H04W 72/0446* (2013.01); *H04W 72/23* (2023.01)

(58) Field of Classification Search
  CPC ... H04L 5/0044; H04L 5/0048; H04L 5/0053; H04L 5/0051; Y02D 30/70
  See application file for complete search history.

(56) References Cited

U.S. PATENT DOCUMENTS

| | | | |
|---|---|---|---|
| 2020/0162208 A1* | 5/2020 | Moon | H04L 1/189 |
| 2021/0235491 A1* | 7/2021 | Iyer | H04W 72/23 |
| 2021/0243781 A1* | 8/2021 | Lei | H04W 72/1268 |
| 2021/0307036 A1* | 9/2021 | Myung | H04W 72/1268 |
| 2022/0116999 A1* | 4/2022 | Xiong | H04W 74/006 |
| 2022/0191902 A1* | 6/2022 | Nunome | H04L 1/1887 |
| 2022/0256578 A1* | 8/2022 | Zhang | H04L 1/1822 |

OTHER PUBLICATIONS

PCT Search Report dated Jul. 2, 2020 in connection with PCT Application No. PCT/US2020/025712.
PCT Written Opinion dated Jul. 3, 2020 in connection with PCT Application No. PCT/US2020/025712.
Intel Corporation: "Enhancements to configured grants for NR-unlicensed" 3GPP Draft; R1-1902474; vol. Ran WG1; Feb. 16, 2019; URL:http//www.3gpp.org/ftp/tsg%5Fran/WG1%5FRL1/TSGR1%5F96/Docs/R1%2D1902474%2Ezip.
Mediatek Inc: "Discussion on NR-U configured grant"; 3GPP Draft; R1-1901801; vol. Ran WG1; Feb. 16, 2019; URL:http://www.3gpp.org/ftp/tsg%5Fran/WG1%%FRL1/TSGR1%5F96/Docs/R1%2D1901801%2Ezip.
Vivo: "Outcome of offline discussion on Configured grant enhancement"; 3GPP Draft; R1-1903476; vol. Ran WG1; Feb. 27, 2019; URL:http://www.3gpp.org/ftp/tsg%5Fran/WG1%5FRL1/TSGR1%5F96/Docs/R1%2D1903476% 2Ezip.
Huawei Et Al: "NR frame structure on unlicensed bands"; 3GPP Draft; R1-1801370; vol. Ran WG1; Feb. 17, 2018; URL:http://www.3gpp.org/ftp/tsg%5Fran/WG1%%FRL1/TSGR1%5F92/Docs/.
5G; NR; Physical layer; General description; (3GPP TS 38.201 version 15.0.0 Release 15); ETSI TS 138 201 V15.0.0; Sep. 2018.

\* cited by examiner

ENABLING MULTIPLE STARTING SYMBOL OCCASIONS FOR CONFIGURED GRANTS IN NEW RADIO (NR) SYSTEMS OPERATING ON UNLICENSED SPECTRUM

REFERENCE TO RELATED APPLICATIONS

This application is a National Phase entry application of International Patent Application No. PCT/US2020/025712 filed Mar. 30, 2020, which claims the benefit of U.S. Provisional Application No. 62/825,649 filed Mar. 28, 2019, entitled "ENABLING MULTIPLE STARTING SYMBOL OCCASIONS FOR CONFIGURED GRANTS IN NEW RADIO (NR) SYSTEMS OPERATING ON UNLICENSED SPECTRUM", the contents of which are herein incorporated by reference in their entirety.

FIELD

The present disclosure relates to wireless technology and more specifically to multiple starting symbol occasions for configured grants (CGs) for new radio (NR) unlicensed spectrum.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich contents and services.

Recently, the first release on NR (5G) specification provided a baseline set of features and components for future cellular communication systems. Each year, the number of mobile devices connected to wireless networks significantly increases. In order to keep up with the demand in mobile data traffic, changes have to be made to system requirements to be able to meet these demands. Three critical areas that need to be enhanced in order to deliver this increase in traffic are larger bandwidth, lower latency, and higher data rates. One of the major limiting factors in wireless innovation is the availability in spectrum. To mitigate this, the unlicensed spectrum has been an area of interest to expand the availability of long-term evolution (LTE). In this context, one major enhancement for LTE in third generation partnership project (3GPP) Release 13 has been to enable its operation in the unlicensed spectrum via licensed-assisted access (LAA), which expands the system bandwidth by utilizing a flexible carrier aggregation (CA) framework introduced by the LTE-Advanced system. Now that the main building blocks for the framework of new radio (NR) have been established, a natural enhancement is to allow this framework to operate on an unlicensed spectrum, especially with respect to enabling multiple starting symbol occasions for configured grants in NR systems.

DETAILED DESCRIPTION

Figure 1:
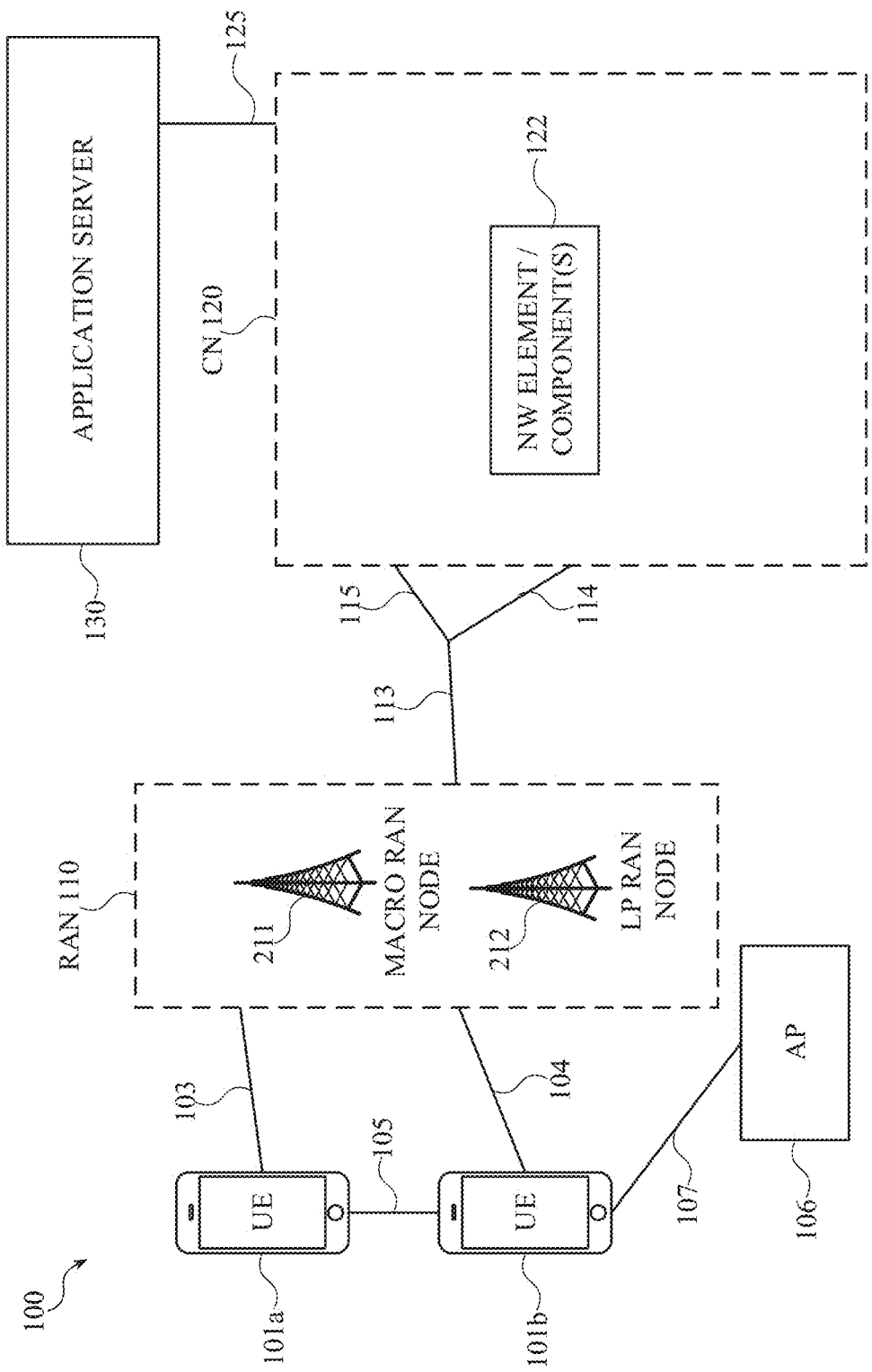
FIG. 1 is an example block diagram illustrating an example of user equipment(s) (UEs) and next generation NodeBs (gNBs) or access nodes in a network with network components useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In consideration of various concerns for managing DRX active time in order to configure a physical uplink channel at a user equipment (UE) based on a configured grant having multiple starting symbol occasions for NUR unlicensed communication. A listen-before-talk (LBT) can be performed on the unlicensed channel according to a configured alignment with one or more orthogonal sequence (OS) indices at the starting symbol occasions. The uplink channel can be a physical uplink shared channel (PUSCH) as type A or type B based on the configured grant and various configurations to take into account both legacy and NR devices for unlicensed communication. Additional aspects and details of the disclosure are further described below with reference to figures.

Embodiments described herein can be implemented into a system or network device using any suitably configured hardware and/or software. FIG. 1 illustrates an architecture of a system 100 of a network in accordance with some embodiments. The system 100 is illustrated to include a UE 101a and a UE 101b, which can further represent new radio (NR) devices (e.g., a UE or gNB) or the like as discussed herein.

FIG. 1 illustrates an example architecture of a system 100 of a network, in accordance with various embodiments. The following description is provided for an example system 100 that operates in conjunction with the LTE system standards and 5G or NR system standards as provided by 2GPP technical specifications. However, the example embodiments are not limited in this regard and the described embodiments can apply to other networks that benefit from the principles described herein, such as future 2GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but can also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, Machine Type Communication (MTC) devices, Machine to Machine (M2M), Internet of Things (IoT) devices, and/or the like.

In some embodiments, any of the UEs 101 can be IoT UEs, which can comprise a network access layer designed for low-power IoT applications utilizing short-lived UE connections. An IoT UE can utilize technologies such as M2M or MTC for exchanging data with an MTC server or device via a public land mobile network (PLMN), Proximity Services (ProSe) or Device-to-Device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 can be configured to connect, for example, communicatively couple, with a Radio Access Network (RAN) 110. In embodiments, the RAN 110 can be a next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 110 that operates in an NR or 5G system 100, and the term "E-UTRAN" or the like can refer to a RAN 110 that operates in an LTE or 4G system 100. The UEs 101 utilize connections (or channels) 102 and 104, respectively, each of which comprises a physical communications interface or layer (discussed in further detail below).

In this example, the connections 102 and 104 are illustrated as an air interface to enable communicative coupling, and can be consistent with cellular communications protocols, such as a Global System for Mobile communications (GSM) protocol, a Code-Division Multiple Access (CDMA) network protocol, a Push-to-Talk (PTT) protocol, a PTT over-cellular (POC) protocol, a Universal Mobile Telecommunications Service (UMTS) protocol, a 2GPP LTE protocol, a 5G protocol, a NR protocol, and/or any of the other communications protocols discussed herein. In embodiments, the UEs 101 can directly exchange communication data via a ProSe interface 105. The ProSe interface 105 can alternatively be referred to as a SL interface 105 and can comprise one or more logical channels, including but not limited to a physical sidelink control channel (PSCCH), a physical sidelink shared channel (PSSCH), a physical sidelink discovery channel (PSDCH), and a physical sidelink broadcast channel (PSBCH).

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various embodiments, the UE 101b, RAN 110, and AP 106 can be configured to utilize LTE-WLAN aggregation (LWA) operation and/or LTE-WLAN Radio Level Integration with IPsec Tunnel (LWIP) operation. The LWA operation can involve the UE 101b in radio resource control RRC_CONNECTED being configured by a RAN node 111a-b to utilize radio resources of LTE and WLAN. LWIP operation can involve the UE 101b using WLAN radio resources (e.g., connection 107) via IPsec protocol tunneling to authenticate and encrypt packets (e.g., IP packets) sent over the connection 107. IPsec tunneling can include encapsulating the entirety of original IP packets and adding a new packet header, thereby protecting the original header of the IP packets.

The RAN 110 can include one or more access nodes (ANs) or RAN nodes 111a and 111b (collectively referred to as "RAN nodes 111" or "RAN node 111") that enable the connections 102 and 104. As used herein, the terms "access node," "access point," or the like can describe equipment that provides the radio baseband functions for data and/or voice connectivity between a network and one or more users. These access nodes can be referred to as BS, gNBs, RAN nodes, eNBs, NodeBs, RSUs, Transmission Reception Points (TRxPs) or TRPs, and so forth, and can comprise ground stations (e.g., terrestrial access points) or satellite stations providing coverage within a geographic area (e.g., a cell). As used herein, the term "NG RAN node" or the like can refer to a RAN node 111 that operates in an NR or 5G system 100 (for example, a gNB), and the term "E-UTRAN node" or the like can refer to a RAN node 111 that operates in an LTE or 4G system 100 (e.g., an eNB). According to various embodiments, the RAN nodes 111 can be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 can be implemented as one or more software entities running on server computers as part of a virtual network, which can be referred to as a centralized RAN (CRAN) and/or a virtual baseband unit pool (vBBUP). In these embodiments, the CRAN or vBBUP can implement a RAN function split, such as a Packet Data Convergence Protocol (PDCP) split wherein Radio Resource Control (RRC) and PDCP layers are operated by the CRAN/vBBUP and other L2 protocol entities are operated by individual RAN nodes 111; a Media Access Control (MAC)/Physical (PHY) layer split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 can represent individual gNB-Distributed Units (DUs) that are connected to a gNB-Control Unit (CU) via individual F1 interfaces. In these implementations, the gNB-DUs can include one or more remote radio heads or RF front end modules (RFEMs), and the gNB-CU can be operated by a server that is located in the RAN 110 (not shown) or by a server pool in a similar manner as the CRAN/vBBUP. Additionally, or alternatively, one or more of the RAN nodes 111 can be next generation eNBs (ng-eNBs), which are RAN nodes that provide E-UTRA user plane and control plane protocol terminations toward the UEs 101, and are connected to a 5GC via an NG interface.

In V2X scenarios one or more of the RAN nodes 111 can be or act as RSUs. The term "Road Side Unit" or "RSU" can refer to any transportation infrastructure entity used for V2X communications. An RSU can be implemented in or by a suitable RAN node or a stationary (or relatively stationary) UE, where an RSU implemented in or by a UE can be referred to as a "UE-type RSU," an RSU implemented in or by an eNB can be referred to as an "eNB-type RSU," an RSU implemented in or by a gNB can be referred to as a "gNB-type RSU," and the like. In one example, an RSU is a computing device coupled with radio frequency circuitry located on a roadside that provides connectivity support to passing vehicle UEs 101 (vUEs 101). The RSU can also include internal data storage circuitry to store intersection map geometry, traffic statistics, media, as well as applications/software to sense and control ongoing vehicular and pedestrian traffic. The RSU can operate on the 5.9 GHz DSRC band to provide very low latency communications required for high speed events, such as crash avoidance, traffic warnings, and the like. Additionally, or alternatively, the RSU can operate on the cellular V2X band to provide the aforementioned low latency communications, as well as other cellular communications services. Additionally, or alternatively, the RSU can operate as a Wi-Fi hotspot (2.4 GHz band) and/or provide connectivity to one or more cellular networks to provide uplink and downlink communications. The computing device(s) and some or all of the radiofrequency circuitry of the RSU can be packaged in a weatherproof enclosure suitable for outdoor installation, and can include a network interface controller to provide a wired connection (e.g., Ethernet) to a traffic signal controller and/or a backhaul network.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using Orthogonal Frequency-Division Multiplexing (OFDM) communication signals with each other or with any of the RAN nodes 111 over a multicarrier communication channel in accordance with various communication techniques, such as, but not limited to, an OFDMA communication technique (e.g., for downlink communications) or a Single Carrier Frequency-Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum can include channels that operate in the frequency range of approximately 400 MHz to approximately 2.8 GHz, whereas the unlicensed spectrum can include the 5 GHz band.

To operate in the unlicensed spectrum, the UEs 101 and the RAN nodes 111 can operate using Licensed Assisted Access (LAA), eLAA, and/or feLAA mechanisms. In these implementations, the UEs 101 and the RAN nodes 111 can perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations can be performed according to a listen-before-talk (LBT) protocol.

LBT is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation can include Clear Channel Assessment (CCA), which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED can include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node can first perform CCA before transmission. Additionally, a backoff mechanism is used to avoid collisions in situations where more than one WLAN node senses the channel as idle and transmits at the same time. The backoff mechanism can be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for downlink (DL) or uplink (UL) transmission bursts including physical downlink shared channel (PDSCH) or physical uplink shared channel (PUSCH) transmissions, respectively, can have an LAA contention window that is variable in length between X and Y extended CCA (ECCA) slots, where X and Y are minimum and maximum values for the contention window sizes (CWSs) for LAA. In one example, the minimum CWS for an LAA transmission can be 9 microseconds (µs); however, the size of the CWS and a maximum channel occupancy time (MOOT) (for example, a transmission burst) can be based on governmental regulatory requirements.

The LAA mechanisms are built upon carrier aggregation (CA) technologies of LTE-Advanced systems. In CA, each aggregated carrier is referred to as a component carrier (CC). A CC can have a bandwidth of 1.4, 2, 5, 10, 15 or 20 MHz and a maximum of about five CCs or otherwise can be aggregated, and therefore, a maximum aggregated bandwidth can be about 100 MHz, for example. In frequency division duplex (FDD) systems, the number of aggregated carriers can be different for DL and UL, where the number of UL CCs is equal to or lower than the number of DL component carriers. In some cases, individual CCs can have a different bandwidth than other CCs. In time division duplex (TDD) systems, the number of CCs as well as the bandwidths of each CC is usually the same for DL and UL.

CA also comprises individual serving cells to provide individual CCs. The coverage of the serving cells can differ, for example, because CCs on different frequency bands will experience different pathloss. A primary service cell or PCell can provide a primary component carrier (PCC) for both UL and DL, and can handle radio resource control (RRC) and non-access stratum (NAS) related activities. The other serving cells are referred to as SCells, and each SCell can provide an individual secondary component carrier (SCC) for both UL and DL. The SCCs can be added and removed as required, while changing the PCC can require the UE 101 to undergo a handover. In LAA, eLAA, and feLAA, some or all of the SCells can operate in the unlicensed spectrum (referred to as "LAA SCells"), and the LAA SCells are assisted by a PCell operating in the licensed spectrum. When a UE is configured with more than one LAA SCell, the UE can receive UL grants on the configured LAA SCells indicating different PUSCH starting positions within a same subframe.

The PDSCH carries user data and higher-layer signaling to the UEs 101. The physical downlink control channel (PDCCH) carries information about the transport format and resource allocations related to the PDSCH channel, among other things. It can also inform the UEs 101 about the transport format, resource allocation, and Hybrid Automatic Repeat Request (HARQ) information related to the uplink shared channel. Typically, downlink scheduling (assigning control and shared channel resource blocks to the UE 101$b$ within a cell) can be performed at any of the RAN nodes 111 based on channel quality information fed back from any of the UEs 101. The downlink resource assignment information can be sent on the PDCCH used for (e.g., assigned to) each of the UEs 101.

The PDCCH uses control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as REGs. Four Quadrature Phase Shift Keying (QPSK) symbols can be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an extended (E)-PDCCH that uses PDSCH resources for control information transmission. The EPDCCH can be transmitted using one or more ECCEs. Similar to above, each ECCE can correspond to nine sets of four physical resource elements known as an EREGs. An ECCE can have other numbers of EREGs in some situations.

The RAN nodes 111 can be configured to communicate with one another via interface 112. In embodiments where the system 100 is an LTE system, the interface 112 can be an X2 interface 112. The X2 interface can be defined between two or more RAN nodes 111 (e.g., two or more eNBs and the like) that connect to evolved packet core (EPC) or core network 120, and/or between two eNBs connecting to EPC 120. In some implementations, the X2 interface can include an X2 user plane interface (X2-U) and an X2 control plane interface (X2-C). The X2-U can provide flow control mechanisms for user data packets transferred over the X2 interface, and can be used to communicate information about the delivery of user data between eNBs. For example, the X2-U can provide specific sequence number information for user data transferred from a master eNB (MeNB) to an secondary eNB (SeNB); information about successful in sequence delivery of PDCP packet data units (PDUs) to a UE 101 from an SeNB for user data; information of PDCP PDUs that were not delivered to a UE 101; information about a current minimum desired buffer size at the SeNB for transmitting to the UE user data; and the like. The X2-C can provide intra-LTE access mobility functionality, including context transfers from source to target eNBs, user plane transport control, etc.; load management functionality; as well as inter-cell interference coordination functionality.

In embodiments where the system 100 is a 5G or NR system, the interface 112 can be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface can include an Xn user plane (Xn-U) interface and an Xn control plane (Xn-C) interface. The Xn-U can provide non-guaranteed delivery of user plane PDUs and support/provide data forwarding and flow control functionality. The Xn-C can provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support can include context transfer from an old (source) serving RAN node 111 to new (target) serving RAN node 111; and control of user plane tunnels between old (source) serving RAN node 111 to new (target) serving RAN node 111. A protocol stack of the Xn-U can include a transport network layer built on Internet Protocol (IP) transport layer, and a GPRS Tunnelling Protocol for User Plane (GTP-U) layer on top of a User Datagram Protocol (UDP) and/or IP layer(s) to carry user plane PDUs. The Xn-C protocol stack can include an application layer signaling protocol (referred to as Xn Application Protocol (Xn-AP)) and a transport network layer that is built on Stream Control Transmission Protocol (SCTP). The SCTP can be on top of an IP layer, and can provide the guaranteed delivery of application layer messages. In the transport IP layer, point-to-point transmission is used to deliver the signaling PDUs. In other implementations, the Xn-U protocol stack and/or the Xn-C protocol stack can be same or similar to the user plane and/or control plane protocol stack(s) shown and described herein.

The RAN 110 is shown to be communicatively coupled to a core network—in this embodiment, core network (CN) 120. The CN 120 can comprise a plurality of network elements 122, which are configured to offer various data and telecommunications services to customers/subscribers (e.g., users of UEs 101) who are connected to the CN 120 via the RAN 110. The components of the CN 120 can be implemented in one physical node or separate physical nodes including components to read and execute instructions from a machine-readable or computer-readable medium (e.g., a non-transitory machine-readable storage medium). In some embodiments, NFV can be utilized to virtualize any or all of the above-described network node functions via executable instructions stored in one or more computer-readable storage mediums (described in further detail below). A logical instantiation of the CN 120 can be referred to as a network slice, and a logical instantiation of a portion of the CN 120 can be referred to as a network sub-slice. Network Function Virtualization (NFV) architectures and infrastructures can be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more Evolved Packet Core (EPC) components/functions.

Generally, the application server 130 can be an element offering applications that use IP bearer resources with the core network (e.g., Universal Mobile Telecommunications System Packet Services (UMTS PS) domain, LTE PS data services, etc.). The application server 130 can also be configured to support one or more communication services (e.g., VoIP sessions, PTT sessions, group communication sessions, social networking services, etc.) for the UEs 101 via the EPC 120.

In embodiments, the CN 120 can be a 5GC (referred to as "5GC 120" or the like), and the RAN 110 can be connected with the CN 120 via an NG interface 112. In embodiments, the NG interface 112 can be split into two parts, an Next Generation (NG) user plane (NG-U) interface 114, which carries traffic data between the RAN nodes 111 and a User Plane Function (UPF), and the S1 control plane (NG-C) interface 115, which is a signaling interface between the RAN nodes 111 and Access and Mobility Management Functions (AMFs). The Core network CN 120 can also be a 5GC 120.

In embodiments, the CN 120 can be a 5G CN (referred to as "5GC 120" or the like), while in other embodiments, the CN 120 can be an EPC). Where CN 120 is an EPC (referred to as "EPC 120" or the like), the RAN 110 can be connected with the CN 120 via an S1 interface 112. In embodiments, the S1 interface 112 can be split into two parts, an S1 user plane (S1-U) interface 114, which carries traffic data between the RAN nodes 111 and the S-GW, and the S1-MME interface 115, which is a signaling interface between the RAN nodes 111 and MMEs.

Figure 2:
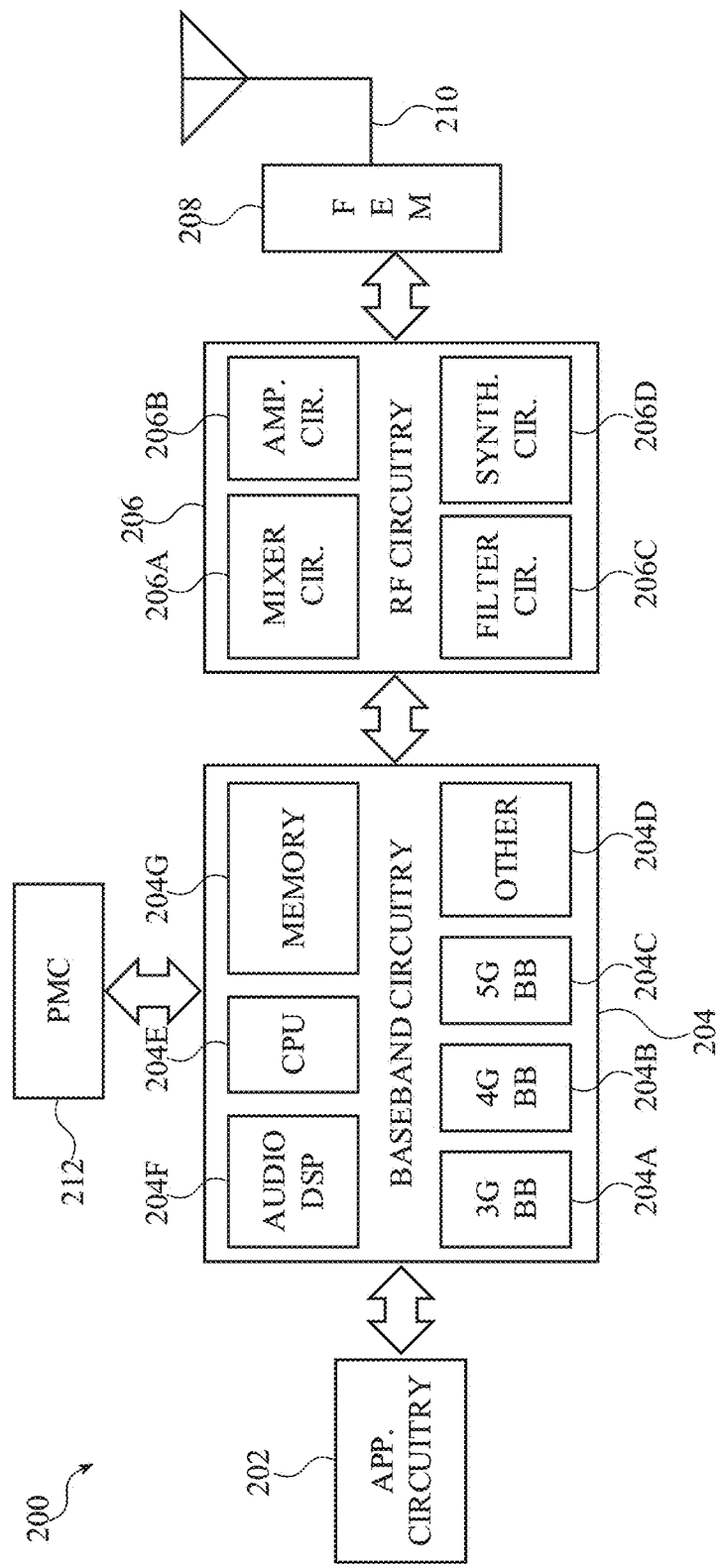
FIG. 2 is another example block diagram illustrating a system employable at a UE or gNB, according to various aspects described herein.

FIG. 2 illustrates example components of a device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node, such as UE 101/102, or eNB/gNB 111/112. In some embodiments, the device 200 can include less elements (e.g., a RAN node can not utilize application circuitry 202, and instead include a processor/controller to process IP data received from an EPC). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low-Density Parity Check (LDPC) encoder/decoder functionality. Embodiments of modulation/demodulation and encoder/decoder functionality are not limited to these examples and can include other suitable functionality in other embodiments.

In addition, the memory 204G (as well as other memory components discussed herein, e.g., memory, data storage, or the like) can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 can not receive data in this state, in order to receive data, it must transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used to execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
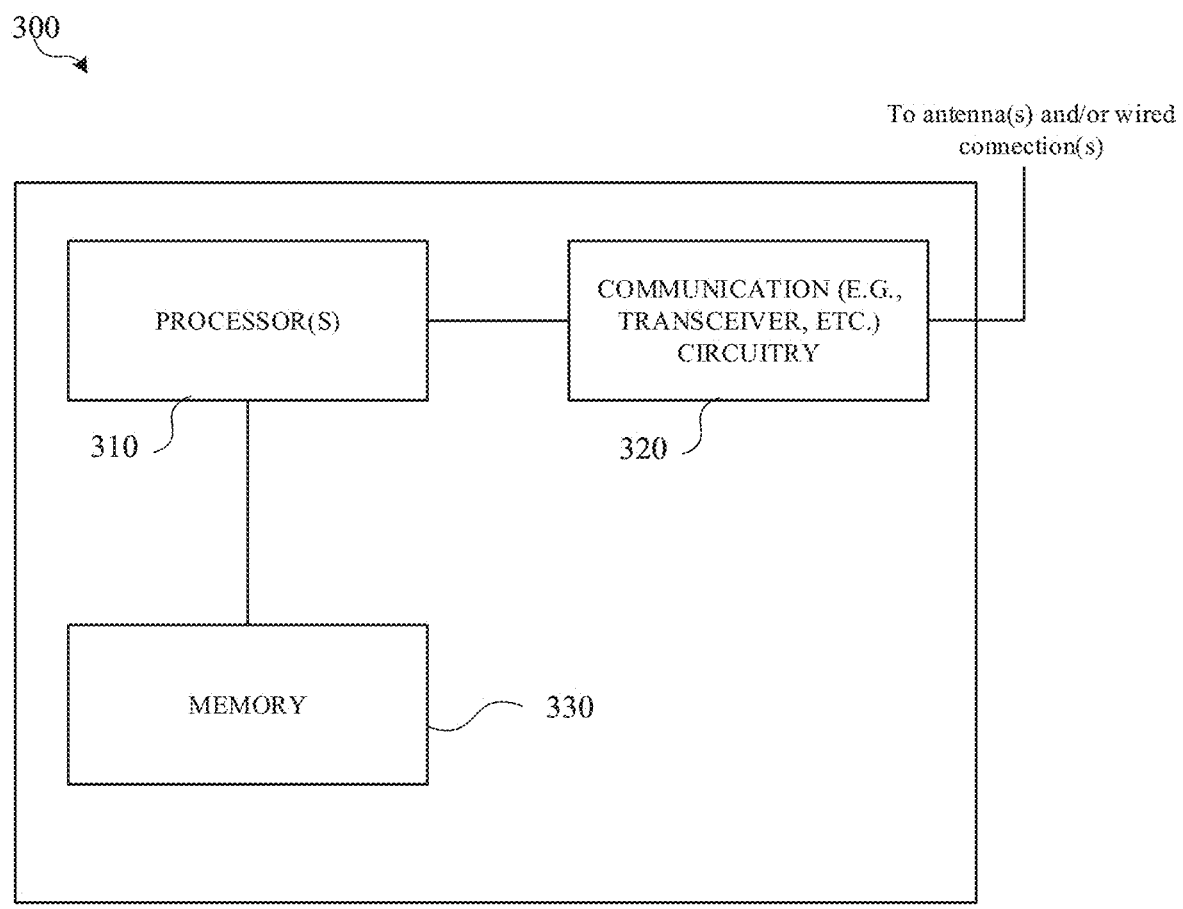
FIG. 3 is an exemplary simplified block diagram of a UE wireless communication device or other network device/component (e.g., gNB) in accordance with various aspects described.

Referring to FIG. 3, illustrated is a block diagram of a user equipment wireless communication device (UE) or other network device/component (e.g., gNB, eNB, or other participating entity). The UE device 300 includes one or more processors 310 (e.g., one or more baseband processors) comprising processing circuitry and associated interface(s), transceiver circuitry 320 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 330 (which can comprise any of a variety of storage mediums and can store instructions and/or data associated with one or more of processor(s) 310 or transceiver circuitry 320).

In various embodiments (aspects) discussed herein, signals or messages can be generated and output for transmission, and/or transmitted messages can be received and processed. Depending on the type of signal or message generated, outputting for transmission (e.g., by processor(s) 310, processor(s) 310, etc.) can comprise one or more of the following: generating a set of associated bits that encode the content of the signal or message, coding (e.g., which can include adding a cyclic redundancy check (CRC) and/or coding via one or more of turbo code, low density parity-check (LDPC) code, tail-biting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 310) can comprise one or more of: identifying physical resources associated with the signal/message, detecting the signal/message, resource element group de-interleaving, demodulation, descrambling, and/or decoding.

According to various embodiments, various types of PUSCH can be performed in two ways: Type A. Slot-based repetitions, i.e. the same time domain allocation can be used in repeated slots, in particular the starting symbol, duration of PUSCH, and PUSCH mapping type in each slot in an aggregation are the same and derived from the time domain resource allocation field of the DCI scheduling PUSCH or activating Type 2 CG-PUSCH; Type B. Back-to-back repetitions (or mini-, miniscule repetitions), i.e. the starting symbol of repetitions other than initial one is derived based on ending symbol of the previous repetition or based on other rule/indication so that repetitions can even be performed within one slot or with minimum/no gap in different slots.

Basically, Type B can be a mechanism of repeating the time domain resource allocation on a back-to-back (or contiguous) basis, instead of on a slot basis, so that the time domain resource allocation gives a starting symbol and duration of the initial transmission and repeated starting from the next available symbol (e.g., symbol 0 in slot n+1 with repetition, in the next slot, or within a slot in other examples), even it may be done in the same slot, so that the duration is given by the duration of the initial transmission; however, the starting symbol of repetition is given by looking for the next available symbol of the previous repetition. Thus, Type B can be different from the Type A repetition.

As the main building blocks for the framework of new radio (NR) have been established, this framework can further be configured operate on an unlicensed spectrum. The work to introduce a shared/unlicensed spectrum in fifth generation (5G) NR has become an objective. Objective(s) of this new work initiative can be as follows:

A) Physical layer aspects can include: 1) a frame structure including single and multiple downlink (DL) to uplink (UL) and UL to DL switching points within a shared channel occupancy time (COT) with associated identified listen before talk (LBT) requirements (as referenced in technical report (TR) 38.889, Section 7.2.1.3.1); and 2) A UL data channel can include extension of the physical uplink shared channel (PUSCH) to support physical resource block (PRB) based frequency block-interlaced transmission; support of multiple PUSCH(s) starting positions in one or multiple slot(s) depending on the LBT outcome with the understanding that the ending position is indicated by the UL grant; design not requiring the UE to change a granted transport block size (TBS) for a PUSCH transmission depending on the LBT outcome. The necessary PUSCH enhancements can be based on cyclic prefix orthogonal frequency division multiplexing (CP-OFDM). Applicability of sub-PRB frequency block-interlaced transmission for 60 kilohertz (kHz) can be further studied and decided.

B) Physical layer procedure(s) can include: 1) for load based equipment (LBE), channel access mechanism in line with agreements from the NR unlicensed spectrum (NR-U) study item (TR 38.889, Section 7.2.1.3.1); 2) Hybrid automatic repeat request (HARQ) operation: NR HARQ feedback mechanisms are the baseline for NR-U operation with extensions in line with agreements during the study phase (NR-U TR section 7.2.1.3.3), including immediate transmission of HARQ acknowledgment/negative acknowledgment (A/N) for the corresponding data in the same shared COT as well as transmission of HARQ A/N in a subsequent COT. Potentially support mechanisms can be provided for multiple and/or supplemental time and/or frequency domain transmission opportunities; 3) scheduling multiple transmission time intervals (TTIs) for PUSCH in-line with agreements from the study phase (TR 38.889, Section 7.2.1.3.3); 4) configured Grant operation: NR Type-1 and Type-2 configured grant mechanisms are the baseline for NR-U operation with modifications in line with agreements during the study phase (NR-U TR section 7.2.1.3.4); and 5) data multiplexing aspects (for both UL and DL) considering LBT and channel access priorities.

One of the challenges in this case is that this system could maintain fair coexistence with other incumbent technologies, and in order to do so, depending on the particular band in which it might operate, some restriction might be taken into account when designing this NR unlicensed communication system. For instance, if operating in the 5 gigahertz (GHz) band, an LBT procedure can be performed to acquire the medium before a transmission can occur. In LTE LAA's autonomous UL (AUL) operation, a configured grant (CG) user equipment (UE) can perform an LBT procedure only at the beginning of a subframe. In NR-U, this puts a restriction on channel access opportunities for the CG UE, which in turn leads to decreased spectral efficiency. Thus, it is desirable to configure a CG channel access operation to allow for multiple starting symbol occasions within a slot. However, given that the current CG operation in NR is considered the baseline for the CG operation in NR-U, the implementation of a starting point for multiple starting symbol occasions can be considered such that it does not have significant specification impact. Therefore, embodiments set forth herein provide details on a design of multiple starting symbol occasions for the different possible configurations of CG in the NR-U operation.

In a NR system or NR device (e.g., UE 101 (as 101a or 101b), gNB operating 110, UE/gNB 200, or UE/gNB 300) on an unlicensed spectrum, since a transmission can be conditional on the success of the LBT procedure, the impact of the LBT procedure on PUSCH transmission could be minimized. Multiple channel access opportunities within a slot can be enabled in order to improve utilization of the channel by a UE 101, 200 or 300 using the CG operation in NR-U. The current NR CG specification could not be significantly impacted and should also be leveraged in obtaining solutions.

Figure 4:
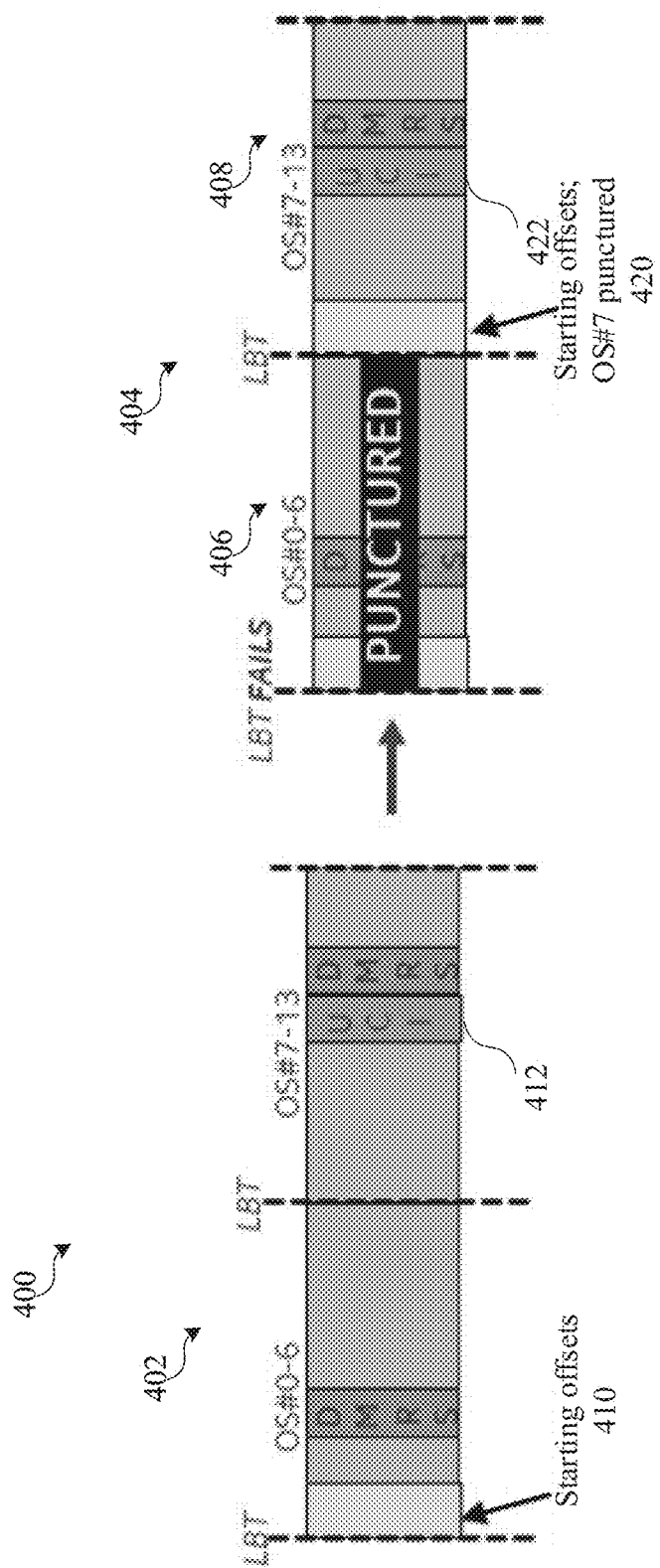
FIG. 4 is another block diagram illustrating demodulation reference signal (DMRS) and uplink control information (UCI) for slots of a configured grant (CG) physical uplink channel with one or more starting occasions in accordance with various aspects described herein.

FIG. 4 illustrates an example demodulation reference signal (DMRS) and UL control information (UCI) configuration mapping in accord with various embodiments. The slots 400 are configured with at least two starting symbol occasions at orthogonal sequence (OS) index #s 0 and 7 based on the outcome of LBT operations in the slot(s) 402 and 404, for example.

In order to facilitate the introduction of multiple starting symbol occasions within a slot 402 or 404 for a CG UE 101, 200 or 300 in an NR-U operation, the PUSCH can be configured such that its detection and decoding performance at the gNB 110, 200, or 300 is not affected. In the event that the UE 101, 200 or 300 fails to access the channel via an LBT procedure at the beginning portion (or first half portion) 406 of the slot 404, should the UE 101, 200 or 300 perform a successful LBT procedure at a symbol later on in the slot (e.g., at OS #7 420) at a second portion 408 of the slot 404, the PUSCH cannot be dynamically changed to fit the available amount of time resources in the slot. Also, the demodulation reference signal (DMRS) cannot be dynamically mapped to any orthogonal frequency division multiplexed (OFDM) symbol (OS) freely by the UE 101, 200 or 300 based on an outcome of the LBT procedure, as the DMRS mapping follows the PUSCH type (e.g., type A or B) and the starting symbol and length indicator value (SLIV) interpretation for the CG UE 101, 200 or 300 in the legacy NR-U operation. Finally, the DMRS and UCI 412 or 422 within the PUSCH can be mapped such that the DMRS and the UCI 412 or 422 are detected and decoded with high reliability within the slot 402 or 404, and not punctured under any circumstance, or else, the decoding of the data will not be possible or will be subject to hypothesis testing that might affect its decoding performance. Thus, the implementation of multiple starting occasions can take in to consideration all of these factors.

In an embodiment, a configured grant can be utilized to configure starting symbols occasions for PUSCH type A in particular. In one embodiment, a CG UE 101, 200 or 300 can be configured with PUSCH type A. In one embodiment, N starting symbol occasions can be configured in a slot (e.g., 402 or 404), where N, as an example, is equal to two and the two starting symbol occasions are at OS #0 and OS #7. In this specific case, one additional DMRS can be configured for a first slot 402 of a CG burst transmission. However, in the general case of N starting symbol occasions, M DMRSs can configured, where each of N and M can be an integer value that ranges from one to four. In an aspect, M may or may not be equal to N. The N starting symbol indexes in a slot 402 or 404 could be predefined, configured by radio resource control (RRC) signaling, or could be derived based on other parameters. In one embodiment, regardless of the number of starting symbol occasions, the number of DMRS configured is equal to two. In one embodiment, regardless of the number of DMRS symbols, the number of starting symbol occasions configured is equal to two. In one embodiment, one or more of the following starting symbol occasions can be used: OS #0, OS #3, OS #5, OS #7. In one embodiment, no additional starting symbol occasions are allowed after OS #7, since can lead to puncturing of the UCI 412 or 422.

In one embodiment, the CG PUSCH in a first slot 402 or 404 can have a length that ranges from 1 symbol to 14 symbols and can be based on a starting symbol occasion that the UE 101, 200 OR 300 can transmit from. In one embodiment, if N=2, then the DMRS can be mapped to OS #2 and OS #11. In case N=3, then the DMRS can be mapped to OS #2, OS #7, and OS #11. In an embodiment where N=4, then the DMRS can be mapped to OS #2, OS #5, OS #8, and OS #11. In one embodiment, regardless of N, if N is larger than or equal to 2, then the DMRS can be mapped to OS #2 and OS #11.

In one embodiment, if N=2, the UE 101, 200 OR 300 can perform the LBT procedure for the CG PUSCH. For example, a start offset 410 could be within OS #0 for 15 kHz sub-carrier spacing (SCS) and randomly selected from within OS #0 or OS #1 for 30 kHz SCS and 60 kHz SCS. If the LBT procedure is unsuccessful at the beginning of the slot 404, then the UE 101, 200 OR 300 can puncture the first half 406 of the PUSCH and use OS #7 for 15 kHz SCS to accommodate the random starting offsets, or OS #7 and perhaps OS #8 for 30 kHz and 60 kHz SCS to accommodate random starting offsets (e.g., 420). This configured operation can be extended for N>2 in a straightforward manner, and equivalent operations can be followed similarly in response.

The operation for N=2 is illustrated, as an example, in FIG. 4 for the case of 15 kHz SCS. Here, if the LBT procedure fails at the beginning of the slot 404, for example, the PUSCH can be punctured up until OS #8, and the DMRS and UCI 422 mapping follow the embodiment described above, and as can be noticed cannot be affected by this operation. In one embodiment, when N=2, the transport block (TB) for the case described above can utilize a code block group (CBG) based transmission, with one CBG mapped from the beginning (OS #0-6) of the slot 402 to OS #6, and the second CBG mapped from OS #7 to the end (OS #7-13) of the slot 402. In one embodiment, the TB for the case described above uses CBG based transmission, with m CBGs mapped from the beginning of the slot 402 to OS #6, and n CBGs mapped from OS #7 to the end of the slot 402, such that m+n<P, where P is the configured number of CBGs. In another embodiment, the first m CBGs are mapped from the beginning of the slot 402 to OS #7, and the last n CBGs are mapped from OS #8 to the end of the slot 402, for example.

In one embodiment, for N starting symbol occasions, N CBGs can be configured and mapped so that the CBGs are mapped such that they align with potential LBT occasions before the starting offsets 410, 420, and an LBT procedure failure at any of the occasions can not affect any of the later CBGs within the slot 404, for example.

In another embodiment, the same approach can be taken as described in the previous embodiment and illustrated by FIG. 4, except that the second starting symbol occasion occurs before OS #7. The starting offsets for the second starting symbol occasion are located in OS #6 for 15 kHz SCS, and within OS #5 and OS #6 for 30 kHz and 60 kHz SCS. Alternatively, or additionally, the starting offsets for the second starting symbol occasion can be configured to be located in OS #6 for 15 kHz, 30 kHz, and 60 kHz SCS. In one embodiment, the TB for the case described above uses CBG based transmission, with one CBG mapped from the beginning of the slot to OS #6, and the second CBG mapped from OS #7 to the end of the slot 402 or 404. In one embodiment, the TB for the case described above uses CBG based transmission, with m CBGs mapped from the beginning of the slot 402 or 404 to OS #6, and n CBGs mapped from OS #7 to the end of the slot, such that m+n<P, where P is the configured number of CBGs. In one embodiment, the punctured m CBGs of the portion 406, for example, due to the success of the LBT procedure in the second starting symbol occasion of the portion 408 as described above can automatically be re-transmitted at the end of the PUSCH burst 400, if time-domain allocation permits.

In another embodiment, the TB uses CBG based transmission, such that the first m CBGs are mapped from the beginning 406 of the slot to OS #6, and the second n CBGs are mapped from OS #7 to the end 408 of the slot 404, such that m+n<P, where P is the configured number of CBGs. Similarly, the slot 402 can also be configured with a first portion or a second portion that could correspond to slot halves or other fractional portions of the slot 402 according to the number of starting symbol occasions, for example.

Figure 5:
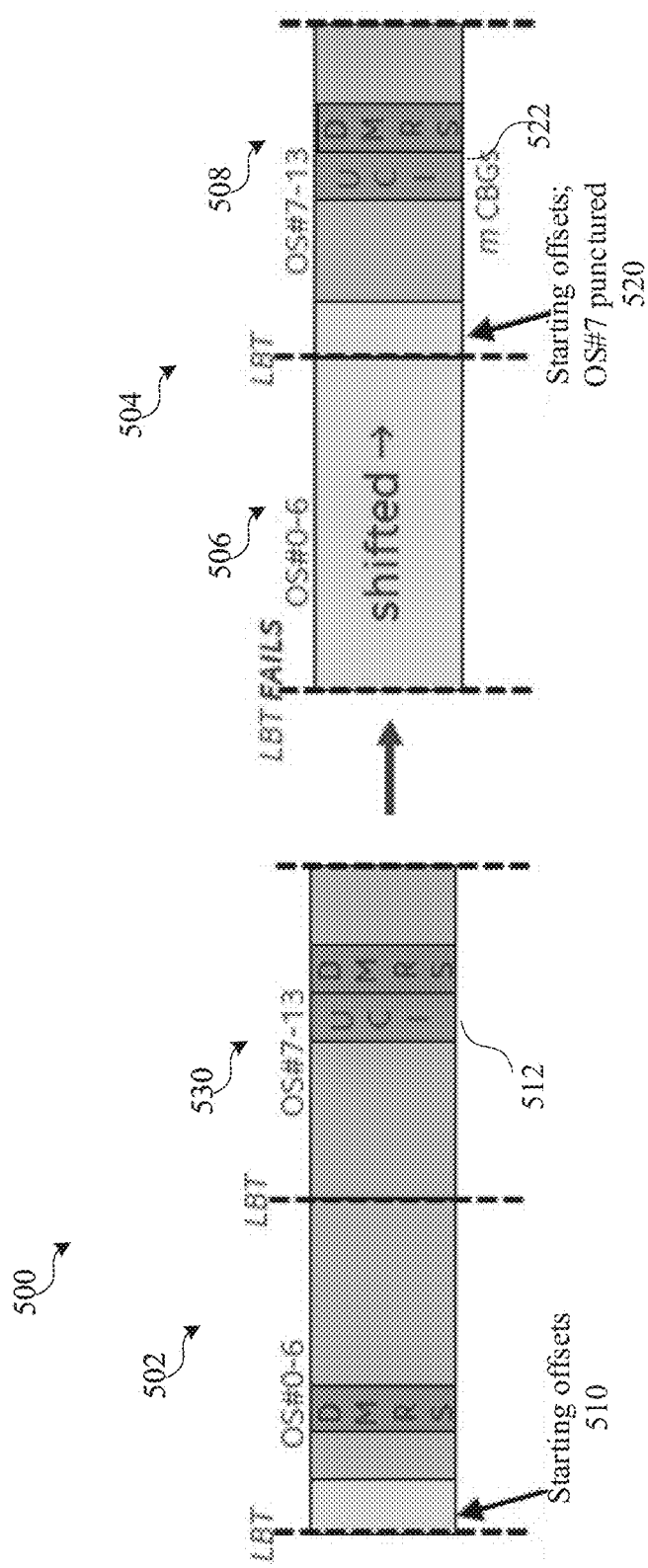
FIG. 5 is another block diagram illustrating control block groups (CBGs) time shifted into a second portion of a slot when LBT succeeds in a second starting symbol occasion in accordance with various aspects described herein.

When an LBT procedure fails at the first starting symbol occasion after offsets 510 in the slot 402 or 404, or similarly in FIG. 5 as slots 502 or 504 at the portion 506, for example, the first m CBGs can be time-shifted into the second half 508 of the slot 504, and the LBT procedure is attempted within OS #7 for 15 kHz SCS or within OS #7 and OS #8 for 30 kHz SCS and 60 kHz SCS. The additional DMRS can be mapped to OS #11 and UCI 512 or 522 can be mapped to the resources before the DMRS. The second n CBGs 530 are punctured in this case from the first slot 502 if the LBT procedure is successful during the second starting symbol occasion at or after the offsets 520, as illustrated in FIG. 5. In one embodiment, the second n CBGs 530 that were punctured due to the successful LBT procedure that occurred in the second starting symbol occasion, as described above, can be automatically re-transmitted at the end of the PUSCH burst, if time-domain allocation permits.

In another embodiment, N starting symbol occasions are configured and there is one CBG mapped to align with each starting symbol occasion and ending in the symbol used for the LBT procedure for the following starting symbol occasion, conditional on the mapping of DMRS and UCI 512 and 520 in the slot 502, 504, such that there are total N CBGs in the slot. Alternatively, or additionally, there can be more than N, but no more than 8 CBGs, for example, such that their aggregate alignment still fits the aforementioned description.

Figure 6:
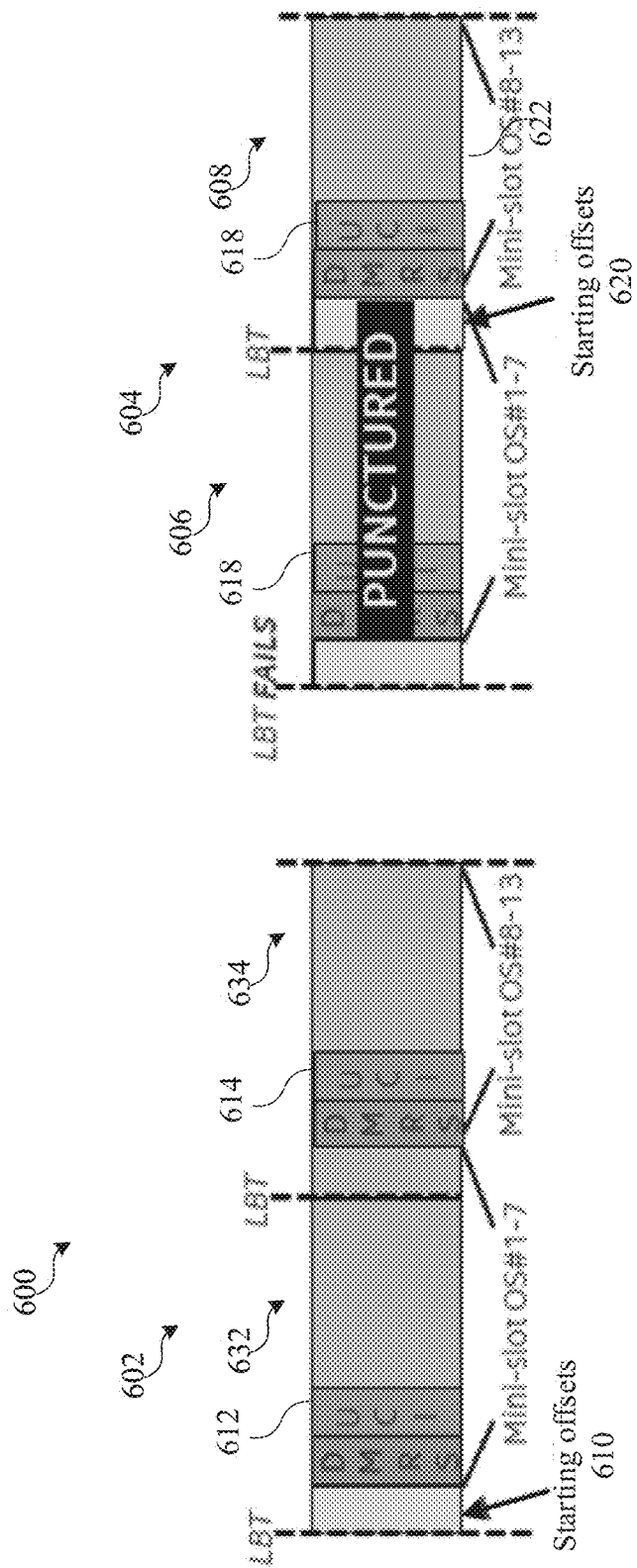
FIG. 6 is an example of multiple starting symbol occasions using mini-slots according to various aspects/embodiments described herein.

In one embodiment, if N=1, UCI is mapped to the resource units/symbol(s) subsequent the DMRS symbol in OS #2, as illustrated for example in FIG. 6. In one embodiment, if N 2, the UCI 522 can be mapped to the resources before the last DMRS symbol, e.g., OS #11, in order to avoid having the UCI 522 punctured if the LBT procedure fails in the first starting symbol occasion at 506, but succeeds in any of the starting symbol occasions after the first one at the portion 508 of a slot 508. In one embodiment, the UCI 522 can be mapped to resources near to the first DMRS symbol located after the last potential start offset 520 of CG PUSCH.

If the first DMRS symbol located after the last potential start offset 520 of CG PUSCH is the last DMRS symbol in a slot, UCI 522 can be mapped before the first DMRS symbol located after the last potential start offset 520 of CG PUSCH. Otherwise, UCI 522 can be mapped after the first DMRS symbol located after the last potential start offset of CG PUSCH, as in FIG. 6 with the slots 602 and 604 of PUSCH transmission 600.

FIG. 6 illustrates another example of a PUSCH transmission burst 600 with slots 602 and 604 according to a PUSCH type B configured for NR unlicensed communication. Each of the slots 602 and 604 comprise at least two portions 632, 634, 606, 608 therein, for example. In one embodiment, N LBT occasions can be configured, where N, as an example, is equal to two and the two LBT occasions could be OS #0 and OS #7 for 15 kHz SCS, and at either OS #0 or OS #1 at beginning of the slot and OS #7 or OS #8 in the middle of the slot for 30 kHz SCS and 60 kHz SCS. In one embodiment, the DMRS can be mapped to the starting symbol SLIV configuration. In one embodiment, a mini-slot format can be used for the first slot 602, and the UCI 612, 614, for example, can be carried for each mini-slot using the resource units/symbol(s) following those used for DMRS transmissions (e.g., mini-slot OS #1-7 and mini-slot OS #8-13). Prior to or at the beginning of the first mini-slot (mini-slot OS #1-7) in the slot 602, the UE 101, 200, or 300 can perform the LBT procedure. For example, the start offset 610 could be within OS #0 for 15 kHz SCS, and within OS #0 or OS #1 for 30 kHz SCS and 60 kHz SCS, where OS #0 or OS #1 offsets are selected based on the SLIV. The first mini-slot (mini-slot OS #1-7) can be mapped to the starting symbols S in the SLIV, and have length L as indicated in the SLIV, and the second mini-slot (mini-slot OS #8-13) in the slot 602 can be implied to have SLIV such that it matches the remaining resources in the slot 602. This mini-slot format can be further extended to the case of N>2 starting symbol occasions in the slot 602, 604.

In one embodiment, a mini-slot CG PUSCH 600 does not cross a slot boundary. In another embodiment, the mini-slot CG PUSCH is configured such that a mini-slot can span the last symbol(s) of a slot 602, and the start symbol(s) of the next slot 604. The LBT symbol occasions for mini-slot based PUSCH type B can always be the symbol before the slot/mini-slot start symbol S, so as not to puncture the DMRS. In essence, if the slot/mini-slot has a start symbol that is S, then the LBT gap is symbol X, where X=(S−1) mod 14 for 15 kHz SCS, and X=(S−2) mod 14 or X=(S−1) mod 14 for 30 kHz and 60 kHz SCS, such that if X>S, then the LBT gap is at the end of the previous slot. The transmissions in the remaining slots (e.g., 604, etc.) can be assumed to be slot based, with S=0 and L=14, once the UE has acquired the channel in the first slot. Alternately, the transmissions in the remaining slots can be assumed to be mini-slot based, with the exception that the first mini-slot is implied to begin at OS #0 in these remaining slots.

In another embodiment, the SLIV can be interpreted to indicate the start symbol of the first mini-slot (mini-slot OS #1-7), and the length of the final slot/mini-slot (mini-slot OS #8-13) in the potentially multi-slot transmission. The lengths of the mini-slots in the first slot can be implicitly indicated to end at the symbol containing the subsequent LBT symbol occasions, and the starting symbols of each mini-slot can always be the symbol after the LBT symbol occasions. Once the LBT procedure is performed, the UE 101, 200, or 300, for example, simply transmits contiguously in the implicit mini-slot format for the remainder of the first slot 602, and then can follow either full slot transmissions for the remainder of the UL burst (if needed), or can continue to follow the implicit mini-slot format until the final slot/mini-slot, which has a length indicated by SLIV.

In one embodiment, at the beginning of a slot, the UE c101, 200, or 300 can perform the LBT procedure and starting offset within OS #0 for 15 kHz SCS, and offset within OS #0 or OS #1 for 30 kHz SCS and 60 kHz SCS, where OS #0 or OS #1 offsets are selected based on a SLIV configuration. For a full slot based PUSCH type B, the additional DMRS and number of starting symbol occasions can be N=2, 3, or 4, and the DMRSs can be mapped according to the current NR specification, which could be OS #10 for 1 additional DMRS, OS #5 and OS #10 for 2 additional DMRSs, and OS #3, OS #6, and OS #9 for 3 additional DMRSs. For the case of N=2, if the LBT procedure is unsuccessful at the beginning of the slot, then the UE can puncture the first half 606 of the PUSCH and OS #7 for 15 kHz SCS to accommodate the random starting offsets 620, or OS #7 and perhaps OS #8 for 30 kHz SCS and 60 kHz SCS to accommodate the random starting offsets 620. Alternatively, the LBT procedure can occur prior to the start of the second half 608 of the slot 404 in OS #6 for 15 kHz SCS, and OS #5 and OS #6 for 30 kHz SCS and 60 kHz SCS. Notice that this LBT procedure can be extended for N>2 in a straightforward manner, and equivalent operations can be followed.

In one embodiment, when N=2 and the PUSCH type is PUSCH type B, the TB for the case described for full slot allocation uses a CBG based transmission, with one CBG mapped from the beginning 632 or 606 of the slot to OS #6, and the second CBG mapped from OS #7 to the end 634 or 608 of the slot. In this embodiment, N is the number of starting symbols. In one embodiment, the TB for the case described above uses CBG based transmission, with m CBGs mapped from the beginning 632 or 606 of the slot to OS #6, and n CBGs mapped from OS #7 to the end of the slot, such that m+n<P, where P is the configured number of CBGs. In another embodiment, there are N starting symbol occasions, and there is one CBG mapped to align with each starting symbol occasion and ending in the symbol used for the LBT procedure for the following starting symbol occasion, conditional on the mapping of the DMRS and the UCI 612, 618 in the slot 602, 604, respectively, such that there are total N CBGs in the slot. Alternatively, there can be more than N but no more than P CBGs, such that their aggregate alignment still fits the aforementioned description.

Figure 7:
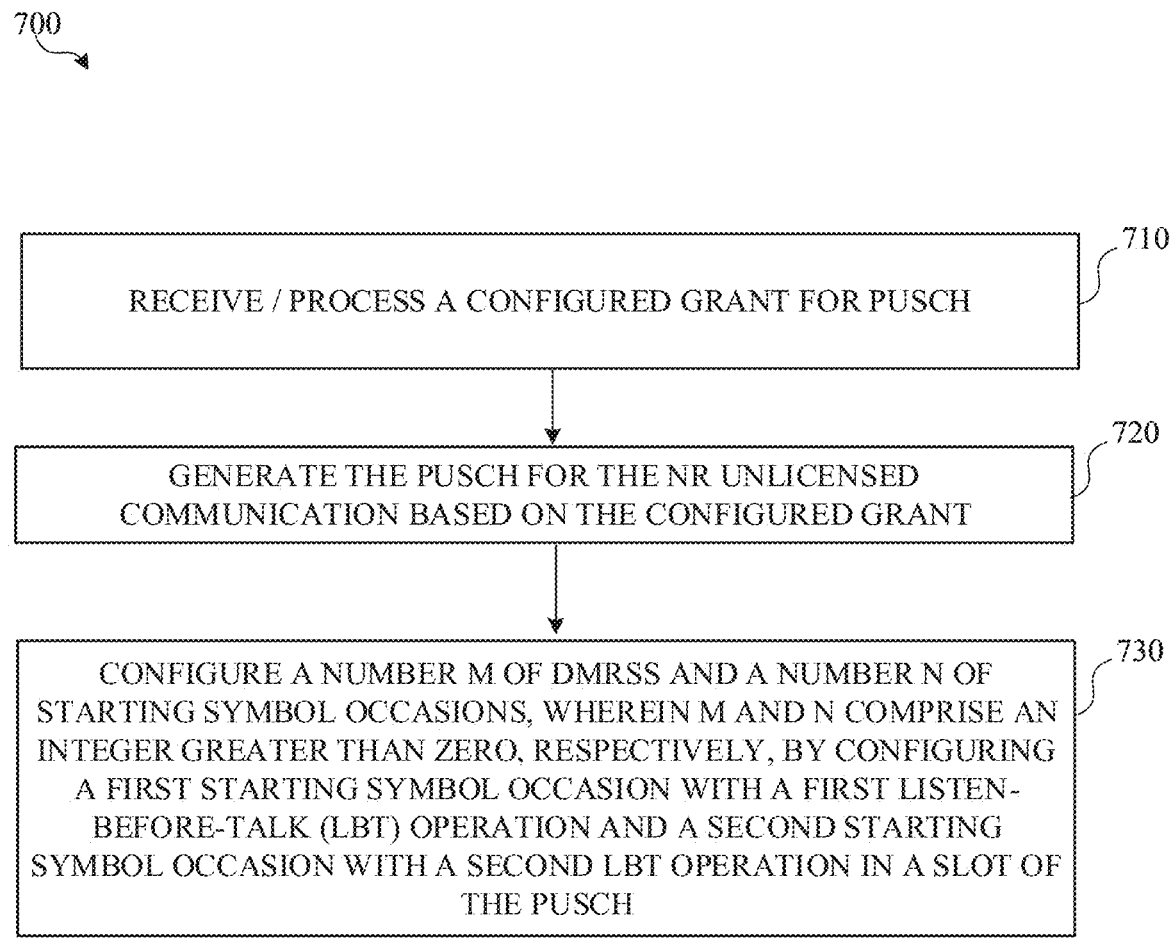
FIG. 7 is an example process flow according to various aspects/embodiments described herein.

Referring to FIG. 7, illustrated an example process flow 700 for a network device (e.g., a user equipment (UE), a new radio NB (gNB), 5GC component or the like) can process, generate, or monitor new radio (NR) unlicensed communication via a 5G network system (5GS) to perform operations/configuration for a physical uplink channel.

The process flow 700 can initiate at 710 with receiving a configured grant for a physical uplink shared channel (PUSCH). At 720, the PUSCH can be generated for the NR unlicensed communication based on the configured grant. At 730, a number M of demodulation reference signals (DMRSs) and a number N of starting symbol occasions can be configured for the PUSCH, wherein M and N comprise an integer greater than zero, respectively, by configuring a first starting symbol occasion with a first listen-before-talk (LBT) operation and a second starting symbol occasion with a second LBT operation in a slot of the PUSCH. M and N can be at least two, and the operations of the process flow 700 can further comprise mapping uplink control information (UCI) before a last configured demodulation reference signal (DMRS) in the slot in response to the PUSCH being a PUSCH type A, and configuring the PUSCH based on a mini-slot format with the UCI using resource units/symbols after one or more DMRS in the slot in response to the PUSCH being a PUSCH type B.

In response to the first LBT operation being unsuccessful, a first half of the PUSCH in the slot can be punctured to accommodate a random starting offset. Additionally, or alternatively, a first code block group (CBG) can be mapped at a first half of the slot and a second CBG at a second half of the slot, wherein at least one of the first CBG or the second CBG are aligned with the first starting symbol occasion or the second starting symbol occasion. In response to the first LBT operation failing at the first starting symbol occasion, the process flow 700 can include time-shifting at least one first CBG of the slot from a first portion to a second portion of the slot. In other aspects, a starting symbol and length indicator value (SLIV) can be mapped to one or more DMRSs in the slot, wherein the slot comprises a first mini-slot associated with a first starting symbol occasion and a second-mini-slot associated with a second start symbol occasion.

Figure 8:
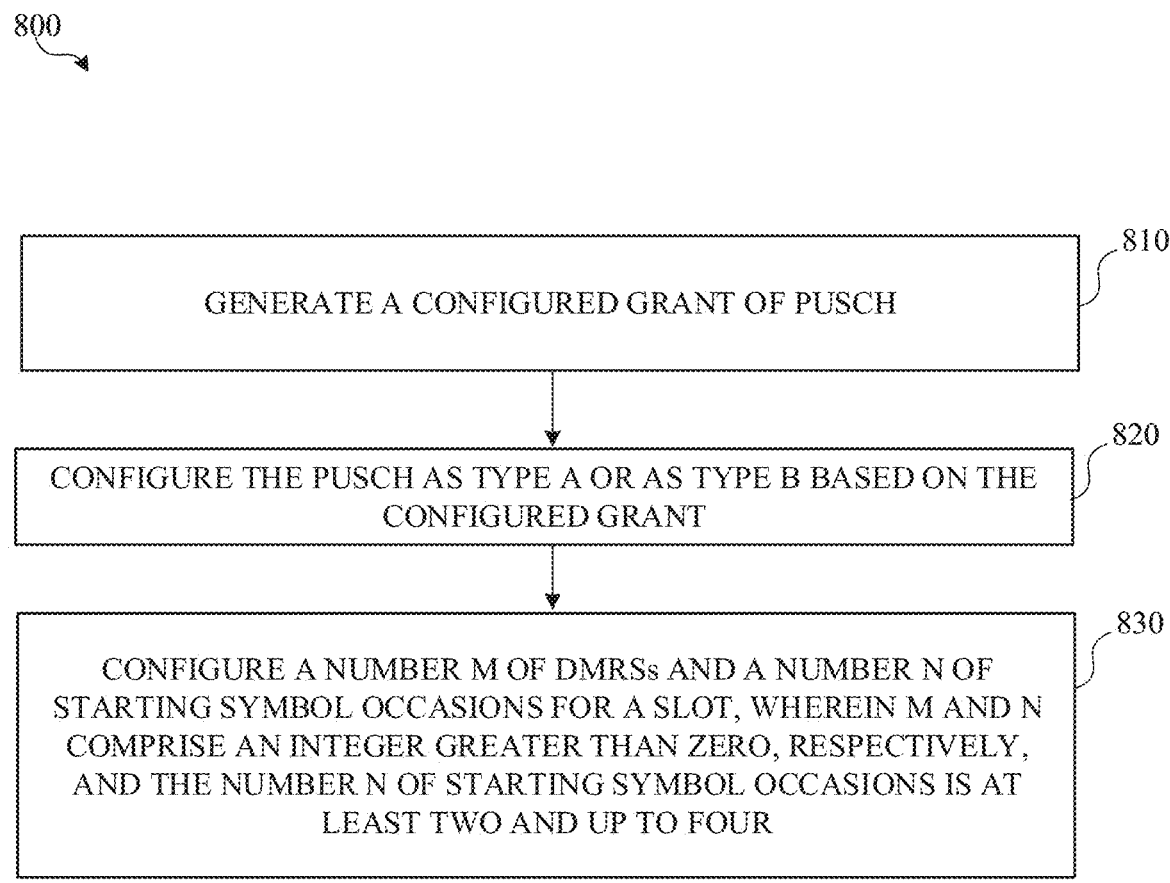
FIG. 8 is another example process flow according to various aspects/embodiments described herein.

Referring to FIG. 8, illustrated an example process flow 800 for a network device (e.g., a user equipment (UE), a new radio NB (gNB), 5GC component or the like) can process, generate, or monitor new radio (NR) unlicensed communication via a 5G network system (5GS) to perform operations/configuration for a physical uplink channel.

The process flow 800 can initiate at 810 with generating a configured grant of a physical uplink shared channel (PUSCH). At 820, the process flow can include configuring the PUSCH as type A or as type B based on the configured grant. At 830, the process flow includes configuring a number M of demodulation reference signals (DMRSs) and a number N of starting symbol occasions for a slot, wherein M and N comprise an integer greater than zero, respectively, and the number N of starting symbol occasions is at least two and up to four.

The process flow 800 can further include processing a first starting symbol occasion and a second starting symbol occasion in the slot of the PUSCH, wherein the first starting symbol occasion and second starting symbol occasion are associated with a first listen-before-talk (LBT) operation and a second LBT operation, respectively. IN addition, or alternatively, the process flow 800 can include mapping an uplink control information (UCI) before a last configured demodulation reference signal (DMRS) in the slot, and uplink control information (UCI) to a resource located before a last DMRS in the slot, in response to the PUSCH being a PUSCH type A, and configure the PUSCH based on a mini-slot format with the UCI using resource units/ symbols after one or more DMRS in the slot, and the UCI to the resource located after the last DMRS in the slot, in response to the PUSCH being a PUSCH type.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

Examples can include one or more non-transitory computer-readable media comprising instructions to cause an electronic device, upon execution of the instructions by one or more processors of the electronic device, to perform one or more elements of a method described in or related to any of examples above, or any other method or process described herein.

The following can be a first set of examples:

Example 1 can include a method for use in implementing multiple starting symbol occasions for a configured grant (CG) user equipment (UE) operating in the unlicensed band of new radio (NR).

Example 2 can include the method of example 1 or some other example herein, wherein the CG UE is configured with physical uplink shared channel (PUSCH) type A or PUSCH type B.

Example 3 can include the method of any one of examples 1-2 or some other example herein, wherein the CG UE is configured with M demodulation reference signals (DMRSs) and N starting occasions in a first slot when attempting to access a channel and wherein each of M and N is a number.

Example 4 can include the method of any one of examples 1-3 or some other example herein, wherein each of M and N ranges from 1 to 4.

Example 5 can include the method of any one of examples 1-4 or some other example herein, wherein M and N are equal to each other.

Example 6 can include the method of any one of examples 1-5 or some other example herein, wherein M and N differ from each other.

Example 7 can include the method of any one of examples 1-6 or some other example herein, where uplink (UL) control information (UCI) is mapped to resources before a latest configured DMRS in a slot.

Example 8 can include the method of any one of examples 1-7 or some other example herein, where the M DMRSs are configured according to an NR specification.

Example 9 can include the method of any one of examples 1-8 or some other example herein, where a latest starting symbol occasion within a slot occurs such that a latest DMRS in a slot is not punctured.

Example 10 can include the method of any one of examples 1-9 or some other example herein, wherein: a first starting symbol occasion precedes a second starting symbol occasion, and the CG UE performs a listen before talk (LBT) operation at the second starting symbol occasion in response to performance of the LBT procedure failing at the first starting symbol occasion.

Example 11 can include the method of any one of examples 1-10 or some other example herein, wherein, in response to the CG UE being configured with PUSCH type B, a starting symbol associated with a start and length indicator value (SLIV) is after a first LBT occasion.

Example 12 can include the method of any one of examples 1-11 or some other example herein, wherein, in response to a slot containing multiple mini-slots, a starting symbol for each mini-slot occurs after a configured LBT occasion in the slot.

Example 13 can include the method of any one of examples 1-12 or some other example herein, wherein a first listen before talk (LBT) occasion precedes a second LBT occasion, wherein a channel access priority is based on an offset in the second LBT occasion, and wherein the offset in the second LBT occasion is in a same format as an offset in the first LBT occasion.

Example 14 can include the method of any one of examples 1-13 or some other example herein, wherein one or more of the first offset and the second offset is determined by the CG UE.

Example 15 can include the method of any one of examples 1-14 or some other example herein, wherein the CG UE punctures the PUSCH from a first symbol in a slot up to a successful LBT symbol occasion.

Example 16 can include the method of any one of examples 1-15 or some other example herein, wherein the PUSCH is based on one or more code block groups (CBGs).

Example 17 can include the method of any one of examples 1-16 or some other example herein, wherein one or more code block groups (CBGs) are mapped to align with a starting symbol occasion in the slot such that a CBG that starts before or during the configured LBT occasion is not mapped in a symbol after the configured LBT occasion.

Example 18 can include the method of any one of examples 1-17 or some other example herein, wherein a total number of code block groups (CBGs) is based on an NR specification.

Example 19 can include the method of any one of examples 1-18 or some other example herein, wherein one or more code block groups (CBGs) that occur prior to a successful LBT procedure are punctured in the slot.

Example 20 can include the method of any one of examples 1-19 or some other example herein, wherein one or more punctured code block groups (CBGs) in the slot are re-transmitted at an end of a PUSCH transmission when time resources are available.

Example 21 can include the method of any one of examples 1-20 or some other example herein, wherein at least one of the one or more CBGs that are at a beginning of the first slot are time-shifted to start after a first successful LBT occasion and wherein any remaining ones of the one or more CBGs that do not fit within a remainder of the first slot are punctured.

Example 22 can include the method of any one of examples 1-21 or some other example herein, wherein any remaining CBGs that are punctured in the first slot are re-transmitted when time resources are available.

Example 23 can include a method of accessing a configured grant (CG) channel associated with a listen before talk (LBT) procedure in a new radio (NR) telecommunications systems operating on an unlicensed spectrum, the method comprising: associating or causing to associate, by a configured grant (CG) user equipment (UE), the CG UE with a physical uplink shared channel (PUSCH); assigning or causing to assign first and second starting symbol occasions to a slot of the PUSCH by the CG UE, the first and second starting symbol occasions associated with performing iterations of the LBT procedure; and performing or causing to perform a first iteration of the LBT procedure at the first starting symbol occasion by the CG UE, wherein a first portion of the slot is associated with the first starting symbol occasion.

Example 24 can include the method of example 23 or some other example herein, further comprising: puncturing or causing to puncture, by the CG UE, the first portion of the slot in response to a failure of the first iteration of the LBT procedure; and performing or causing to perform a second iteration of the LBT procedure, by the CG UE, at the second starting symbol occasion, wherein a second portion of the slot that occurs after the first portion of the slot is associated with the second starting symbol occasion.

Example 25 can include the method of any one of the examples 23-24 or some other example herein, further comprising: mapping a first code block group (CBG) associated with a transport block (TB) to the first portion of the slot by the CG UE, wherein the TB is associated with the LBT procedure; and mapping a second CBG associated with the TB to the second portion of the slot by the CG UE.

Example 26 can include the method of any one of the examples 23-25 or some other example herein, further comprising: mapping or causing to map one or more demodulation reference signals (DMRSs) to one or more of the first starting symbol occasion and the second starting symbol occasion by the CG UE; and mapping or causing to map uplink (UL) control information (UCI) to one or more of the first starting symbol occasion and the second starting symbol occasion by the CG UE.

Example 27 can include the method of any one of the examples 23-26 or some other example herein, further comprising: mapping or causing to map a starting symbol and length indicator value (SLIV) to the one or more DMRSs by the CG UE.

Example 28 can include the method of any one of the examples 23-27 or some other example herein, wherein the slot comprises first and second mini-slots, wherein the first starting symbol occasion is associated with the first mini-slot, and wherein the second starting symbol occasion is associated with the second mini-slot.

Example 29 can include the method of any one of the examples 23-28 or some other example herein, wherein a first UCI is associated with the first mini-slot and a second UCI that differs from the first UCI is associated with the second mini-slot, wherein the first UCI indicates information associated with the first mini-slot, and wherein the second UCI indicates information associated with the second mini-slot.

Example 30 can include the method of any one of the examples 23-29 or some other example herein, wherein the first portion of the slot comprises a beginning of the slot.

Example 31 can include the method any one of the examples 23-30 or some other example herein, wherein the second portion of the slot comprises a middle of the slot.

Example 32 can include an apparatus comprising means to perform one or more elements of a method described in or related to any of examples 1-31, or any other method or process described herein.

Example 33 can include one or more non-transitory computer-readable media comprising instructions to cause an electronic device, upon execution of the instructions by one or more processors of the electronic device, to perform one or more elements of a method described in or related to any of examples 1-31, or any other method or process described herein.

Example 34 can include an apparatus comprising logic, modules, or circuitry to perform one or more elements of a method described in or related to any of examples 1-31, or any other method or process described herein.

Example 35 can include a method, technique, or process as described in or related to any of examples 1-31, or portions or parts thereof.

Example 36 can include an apparatus comprising: one or more processors and one or more computer-readable media comprising instructions that, when executed by the one or more processors, cause the one or more processors to perform the method, techniques, or process as described in or related to any of examples 1-31, or portions thereof.

Example 37 can include a signal as described in or related to any of examples 1-31, or portions or parts thereof.

Example 38 can include a datagram, packet, frame, segment, protocol data unit (PDU), or message as described in or related to any of examples 1-31, or portions or parts thereof, or otherwise described in the present disclosure.

Example 39 can include a signal encoded with data as described in or related to any of examples 1-31, or portions or parts thereof, or otherwise described in the present disclosure.

Example 40 can include a signal encoded with a datagram, packet, frame, segment, protocol data unit (PDU), or message as described in or related to any of examples 1-31, or portions or parts thereof, or otherwise described in the present disclosure.

Example 41 can include an electromagnetic signal carrying computer-readable instructions, wherein execution of the computer-readable instructions by one or more processors is to cause the one or more processors to perform the method, techniques, or process as described in or related to any of examples 1-31, or portions thereof.

Example 42 can include a computer program comprising instructions, wherein execution of the program by a processing element is to cause the processing element to carry out the method, techniques, or process as described in or related to any of examples 1-31, or portions thereof.

Example 43 can include a signal in a wireless network as shown and described herein.

Example 44 can include a method of communicating in a wireless network as shown and described herein.

Example 45 can include a system for providing wireless communication as shown and described herein.

Example 46 can include a device for providing wireless communication as shown and described herein.

Example 47 can include an apparatus according to any of any one of examples 1-31, wherein the apparatus or any portion thereof is implemented in or by a user equipment (UE).

Example 48 can include a method according to any of any one of examples 1-31, wherein the method or any portion thereof is implemented in or by a user equipment (UE).

Example 49 can include an apparatus according to any of any one of examples 1-31, wherein the apparatus or any portion thereof is implemented in or by a base station (BS).

Example 50 can include a method according to any of any one of examples 1-31, wherein the method or any portion thereof is implemented in or by a base station (BS).

The following can be a second set of examples:

A first example is an apparatus configured to be employed in a User Equipment (UE) for a new radio (NR) unlicensed communication comprising: one or more processors configured to: process a configured grant of a physical uplink shared channel (PUSCH); configure the PUSCH as type A or as type B based on the configured grant; and configure a number M of demodulation reference signals (DMRSs) and a number N of starting symbol occasions in a slot in response to initiation of access to a channel, wherein M and N comprise an integer greater than zero, respectively; a radio frequency (RF) interface, configured to provide, to RF circuitry, data for transmitting the NR unlicensed communication based on the configured grant.

A second example includes the subject matter of the first example, wherein the number M and the number N comprise a range from one to four, wherein the number M and the number N are equal or differ from one another.

A third example includes the subject matter of any one of the first thru second examples, wherein the one or more processors are further configured to process a first starting symbol occasion and a second starting symbol occasion in the slot of the PUSCH, wherein the first starting symbol occasion and second starting symbol occasion are associated with a first listen-before-talk (LBT) operation and a second LBT operation respectively.

A fourth example includes the subject matter of any one of the first thru third examples, wherein the one or more processors are further configured to generate DMRSs at particular orthogonal sequence (OS) indices of the slot, wherein the particular OS indices are based on starting symbol occasions being located before OS #9 in the slot.

A fifth example includes the subject matter of any one of the first thru fourth examples, wherein the one or more processors are further configured to generate a first LBT operation at a first starting symbol occasion, and puncture a first portion of the slot up to a second LBT operation at a second starting symbol occasion.

A sixth example includes the subject matter of any one of the first thru fifth examples, wherein the one or more processors are further configured to: mapping a first code block group (CBG) to a first portion of the slot; and mapping a second CBG associated with a transport block (TB) to a second portion of the slot.

A seventh example includes the subject matter of any one of the first thru sixth examples, wherein the one or more processors are further configured to align the first CBG and the second CBG with potential LBT occasions in the slot, wherein the PUSCH is based on one or more CBGs, and puncture the one or more CBGs prior to a first successful LBT occasion.

A eighth example includes the subject matter of any one of the first thru seventh examples, wherein the one or more processors are further configured to: re-transmit at least one of the one or more CBGs that are punctured in the slot at an end of a PUSCH transmission, and time-shifting the at least one of the one or more CBGs to start after the first successful LBT occasion, wherein any remaining CBG of the one or more CGS that do not fit within a remainder of the slot are punctured.

A ninth example includes the subject matter of any one of the first thru eighth examples, wherein the one or more processors are further configured to: map uplink control information (UCI) to a resource located before a last DMRS in the slot.

A tenth example includes the subject matter of any one of the first thru ninth examples, wherein the one or more processors are further configured to: in response to the PUSCH being configured as type B based on the configured grant, providing a starting symbol occasion associated with a start and length indicator value (SLIV) after a first LBT occasion, and in response to the slot comprising a plurality of mini-slots, a starting symbol of a mini-slot of the plurality of mini-slots occurs after a configured LGT occasion in the slot.

An eleventh example includes the subject matter of any one of the first thru tenth examples, wherein the one or more processors are further configured to: transmit contiguously in a mini-slot format for a remainder of the slot after an LBT operation is performed, and configure a mini-slot format or a full slot format, until a final slot/mini-slot of the NR unlicensed communication.

A twelfth example includes a tangible computer readable storage device storing executable instructions that, in response to execution, cause one or more processors of User Equipment (UE) for a new radio (NR) unlicensed communication to perform operations, the operations comprising: receiving a configured grant for a physical uplink shared channel (PUSCH); generating the PUSCH for the NR unlicensed communication based on the configured grant; and configuring a number M of demodulation reference signals (DMRSs) and a number N of starting symbol occasions, wherein M and N comprise an integer greater than zero, respectively, by configuring a first starting symbol occasion with a first listen-before-talk (LBT) operation and a second starting symbol occasion with a second LBT operation in a slot of the PUSCH.

A thirteenth example includes the subject matter of the twelfth example, wherein M and N are at least two, and the operations further comprise mapping uplink control information (UCI) before a last configured demodulation reference signal (DMRS) in the slot in response to the PUSCH being a PUSCH type A, and configuring the PUSCH based on a mini-slot format with the UCI using resource units/symbols after one or more DMRS in the slot in response to the PUSCH being a PUSCH type B.

A fourteenth example includes the subject matter of any one of the twelfth thru thirteenth examples, wherein the operations further comprise: in response to the first LBT operation being unsuccessful, puncturing a first half of the PUSCH in the slot to accommodate a random starting offset.

A fifteenth example includes the subject matter of any one of the twelfth thru fourteenth examples, wherein the operations further comprise: mapping a first code block group (CBG) at a first half of the slot and a second CBG at a second half of the slot, wherein at least one of the first CBG or the second CBG are aligned with the first starting symbol occasion or the second starting symbol occasion.

A sixteenth example includes the subject matter of any one of the twelfth thru fifteenth examples wherein the operations further comprise: in response to the first LBT operation failing at the first starting symbol occasion, time-shifting at least one first CBG of the slot from a first portion to a second portion of the slot.

A seventeenth example includes the subject matter of any one of the twelfth thru sixteenth examples, wherein the operations further comprise: mapping a starting symbol and length indicator value (SLIV) to one or more DMRSs in the slot, wherein the slot comprises a first mini-slot associated with a first starting symbol occasion and a second-mini-slot associated with a second start symbol occasion.

An eighteenth example is an apparatus configured to be employed at a next generation NodeB (gNB) for a new radio (NR) unlicensed communication in a 5G network system (5GS) comprising: one or more processors configured to: generate a configured grant of a physical uplink shared channel (PUSCH); configure the PUSCH as type A or as type B based on the configured grant; and configure a number M of demodulation reference signals (DMRSs) and a number N of starting symbol occasions for a slot, wherein M and N comprise an integer greater than zero, respectively, and the number N of starting symbol occasions is at least two and up to four; a radio frequency (RF) interface, configured to provide, to RF circuitry, data for transmitting the NR unlicensed communication based on the configured grant.

A nineteenth example includes the subject matter of the eighteenth example, wherein the one or more processors are further configured to process a first starting symbol occasion and a second starting symbol occasion in the slot of the PUSCH, wherein the first starting symbol occasion and second starting symbol occasion are associated with a first listen-before-talk (LBT) operation and a second LBT operation, respectively.

A twentieth example includes the subject matter of the eighteenth or nineteenth example, wherein the one or more processors are further configured to map an uplink control information (UCI) before a last configured demodulation reference signal (DMRS) in the slot, and uplink control information (UCI) to a resource located before a last DMRS in the slot, in response to the PUSCH being a PUSCH type A, and configure the PUSCH based on a mini-slot format with the UCI using resource units/symbols after one or more DMRS in the slot, and the UCI to the resource located after the last DMRS in the slot, in response to the PUSCH being a PUSCH type.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A baseband processor, comprising:
   one or more processors configured to:
      process a configured grant of a physical uplink shared channel (PUSCH) for an unlicensed communication, the configured grant indicating the PUSCH being type A or type B;
      determine a number M of demodulation reference signals (DMRSs) and a number N of starting symbol occasions in a slot in response to initiation of a channel access for the PUSCH, wherein M and N comprise an integer of at least two, respectively;
      wherein, responsive to the PUSCH being type A, uplink control information (UCI) is mapped to a resource located before a last DMRS in the slot and after a first DMRS in the slot, and
      wherein, responsive to the PUSCH being type B, the UCI is mapped to a resource located after the last DMRS in the slot; and
   a radio frequency (RF) interface, configured to provide, to RF circuitry, data for transmitting the unlicensed communication based on the configured grant.

2. The baseband processor of claim 1, wherein the number M and the number N comprise a range from two to four, wherein the number M and the number N are equal.

3. The baseband processor of claim 1, wherein the one or more processors are further configured to process a first starting symbol occasion and a second starting symbol occasion in the slot of the PUSCH, wherein the first starting symbol occasion and second starting symbol occasion are associated with a first listen-before-talk (LBT) operation and a second LBT operation respectively.

4. The baseband processor of claim 1, wherein the one or more processors are further configured to generate DMRSs at particular orthogonal sequence (OS) indices of the slot, wherein the particular OS indices are based on starting symbol occasions being located before OS #9 in the slot.

5. The baseband processor of claim 1, wherein the one or more processors are further configured to generate a first listen-before-talk (LBT) operation at a first LBT symbol occasion immediately before a first starting symbol occasion of the number N of starting symbol occasions, and puncture a first portion of the slot up to a second LBT operation at a second LBT symbol occasion immediately before a second starting symbol occasion of the number N of starting symbol occasions.

6. The baseband processor of claim 1, wherein the one or more processors are further configured to:
   map a first code block group (CBG) to a first portion of the slot; and
   map a second CBG associated with a transport block (TB) to a second portion of the slot.

7. The baseband processor of claim 6, wherein the one or more processors are further configured to align the first CBG and the second CBG with potential listen-before-talk (LBT) occasions in the slot, wherein the PUSCH is based on one or more CBGs, and puncture the one or more CBGs prior to a first successful LBT occasion.

8. The baseband processor of claim 7, wherein the one or more processors are further configured to:
   re-transmit at least one of the one or more CBGs that are punctured in the slot at an end of a PUSCH transmission, and time-shifting the at least one of the one or more CBGs to start after the first successful LBT occasion, wherein any remaining CBG of the one or more CBGs that do not fit within a remainder of the slot are punctured.

9. The baseband processor of claim 1, wherein responsive to the PUSCH being type A, the number M of DMRSs are mapped to at least orthogonal sequence (OS) indices 2 and 11 of the slot.

10. The baseband processor of claim 1, wherein, responsive to the PUSCH being type B, the UCI is also mapped to another resource located after the first DMRS in the slot.

11. The baseband processor of claim 1, wherein the one or more processors are further configured to:
    transmit contiguously in a mini-slot format for a remainder of the slot after a listen-before-talk (LBT) operation is performed, and configure a full slot format, until a final slot of the unlicensed communication.

12. A non-transitory computer readable storage device storing executable instructions that, in response to execution, cause one or more processors of User Equipment (UE) for an unlicensed communication to perform operations, the operations comprising:
    receiving a configured grant for a physical uplink shared channel (PUSCH);
    generating the PUSCH for the unlicensed communication based on the configured grant;
    determining a number M of demodulation reference signals (DMRSs) and a number N of starting symbol occasions, wherein M and N comprise an integer of at least two, respectively, wherein a first starting symbol occasion is configured with a first listen-before-talk (LBT) operation and a second starting symbol occasion is configured with a second LBT operation in a slot of the PUSCH;
    mapping the number M of DMRSs to symbols after respective starting symbols of the number N of starting symbol occasions and map uplink control information (UCI) to a resource located before a last DMRS in the slot, in a case where the PUSCH is type A; and mapping the UCI to a resource located after the last DMRS in the slot, in a case where the PUSCH is type B and the PUSCH has a mini-slot format.

13. The non-transitory computer readable storage device of claim 12, wherein the number M and the number N differ from one another.

14. The non-transitory computer readable storage device of claim 12, wherein the operations further comprise:
in response to the first LBT operation being unsuccessful, puncturing a first half of the PUSCH in the slot to accommodate a random starting offset.

15. The non-transitory computer readable storage device of claim 12, wherein the operations further comprise:
mapping a first code block group (CBG) at a first half of the slot and a second CBG at a second half of the slot, wherein at least one of the first CBG or the second CBG are aligned with the first starting symbol occasion or the second starting symbol occasion.

16. The non-transitory computer readable storage device of claim 12, wherein the operations further comprise:
in response to the first LBT operation failing at the first starting symbol occasion, time-shifting at least one first CBG of the slot from a first portion to a second portion of the slot.

17. The non-transitory computer readable storage device of claim 12, wherein the operations further comprise:
mapping a starting symbol and length indicator value (SLIV) to one or more DMRSs in the slot, wherein the slot comprises a first mini-slot associated with a first starting symbol occasion and a second mini-slot associated with a second starting symbol occasion.

18. A baseband processor, comprising:
one or more processors configured to:
generate a configured grant of a physical uplink shared channel (PUSCH) for an unlicensed communication, the configured grant indicating the PUSCH being type A or type B;
configure a number M of demodulation reference signals (DMRSs) and a number N of starting symbol occasions for a slot, wherein M and N are respectively at least two and up to four, wherein a first starting symbol occasion of the number N of starting symbol occasions is configured with a starting offset of at least one symbol from a beginning of the slot;
map uplink control information (UCI) to a resource located before a last DMRS in the slot, in a case where the PUSCH is type A; and
map the UCI to a resource located after the last DMRS in the slot, in a case where the PUSCH is type B; and
a radio frequency (RF) interface, configured to provide, to RF circuitry, data for transmitting the unlicensed communication based on the configured grant.

19. The baseband processor of claim 18, wherein the one or more processors are further configured to generate a first listen-before-talk (LBT) operation at a first LBT symbol occasion immediately before the first starting symbol occasion.

20. The baseband processor of claim 19, wherein the one or more processors are further configured to configure the PUSCH with a mini-slot format.

\* \* \* \* \*